Sept. 6, 1966  J. DE MONTREMY ETAL  3,271,097
METHODS AND APPARATUS FOR MAKING ANIMATED CARTOONS
Filed April 24, 1964  4 Sheets-Sheet 4
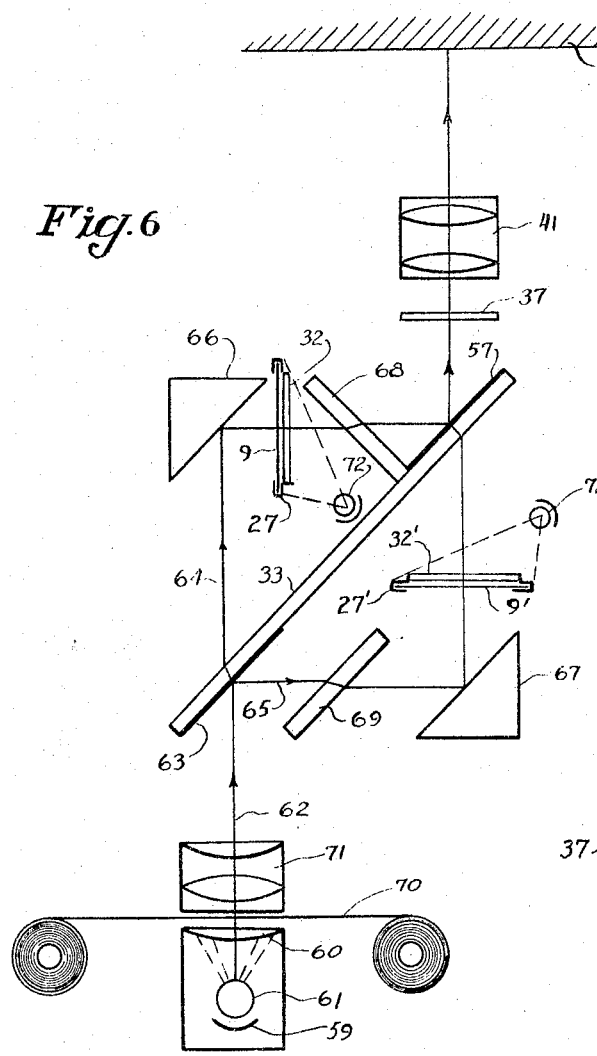
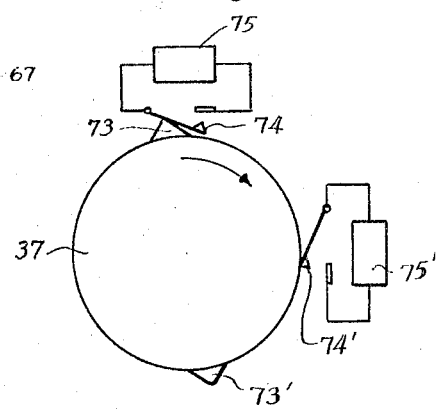
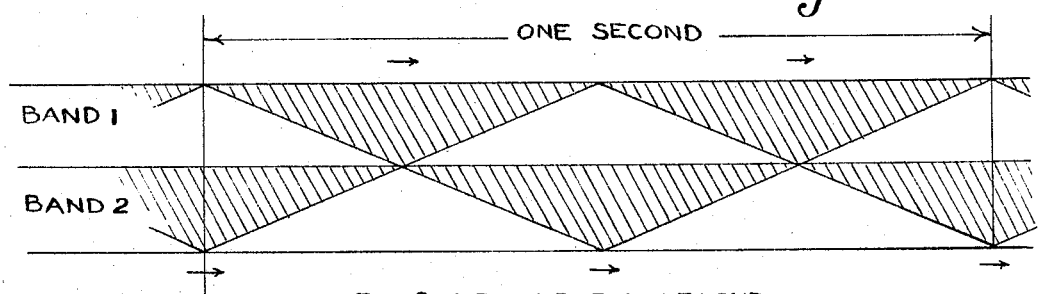
INVENTORS
JEAN DE MONTREMY
Jean Véran Dejoux
BY
ATTORNEYS

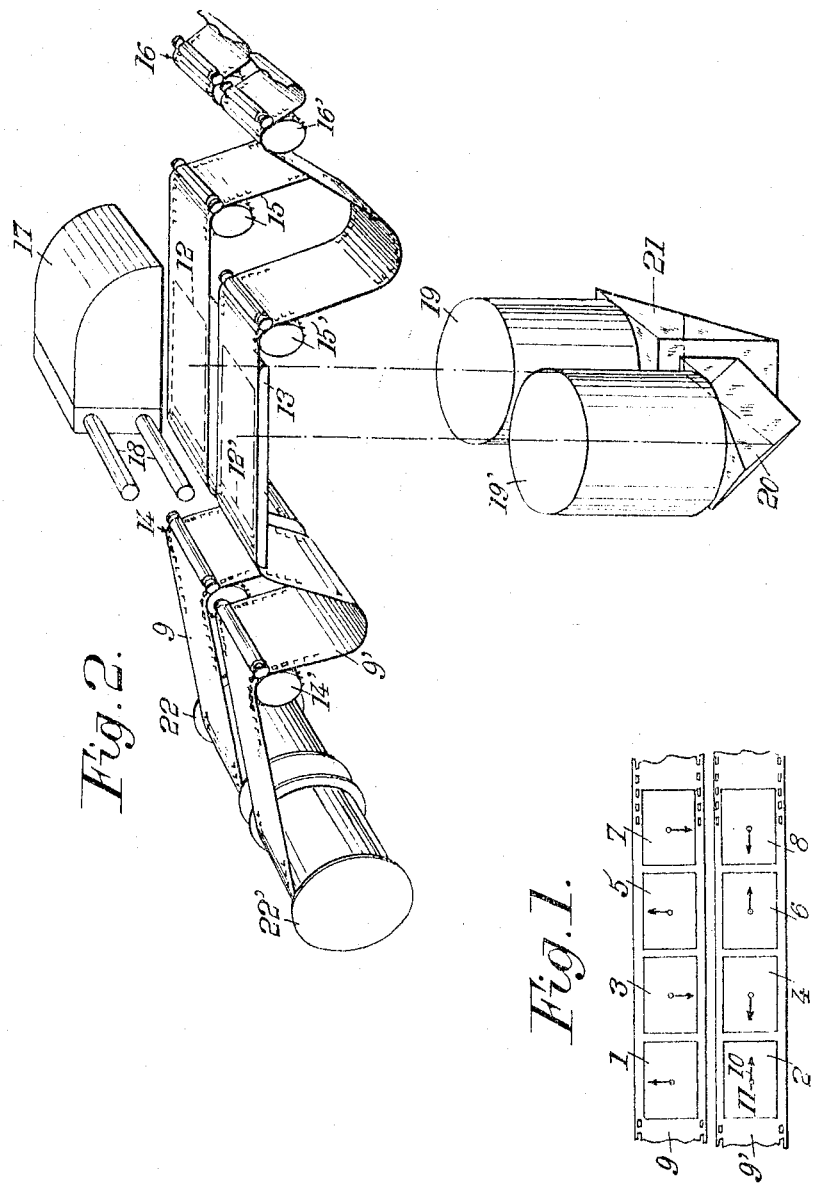

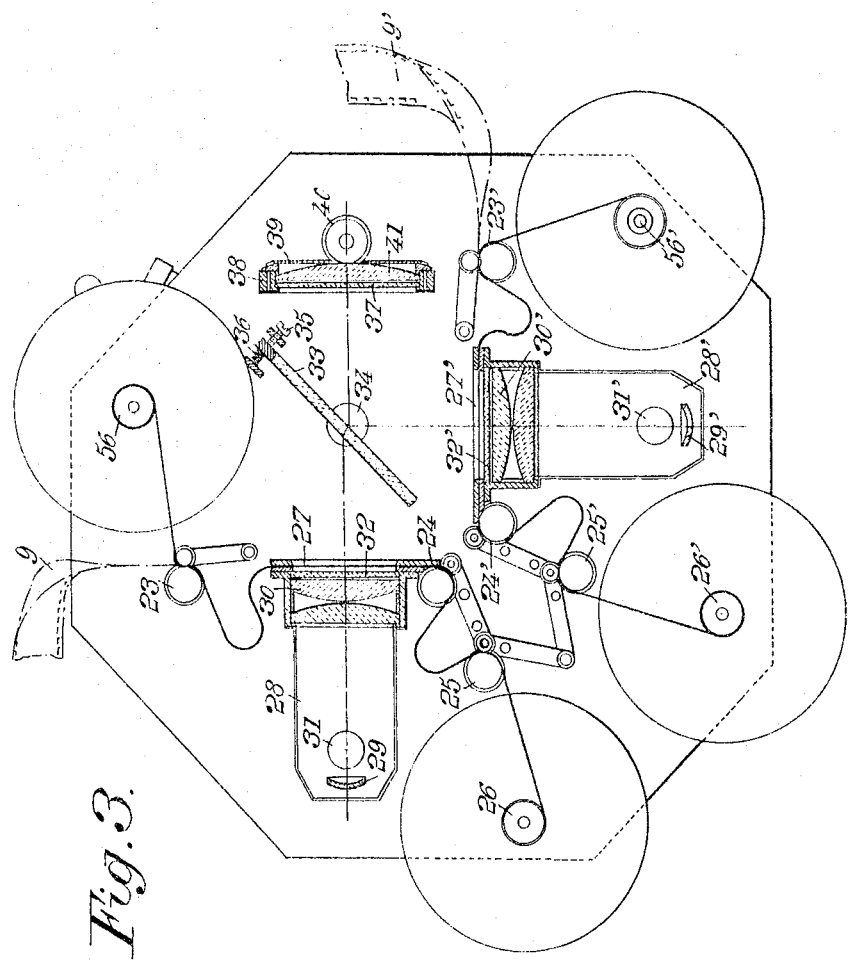

United States Patent Office 3,271,097
Patented Sept. 6, 1966

3,271,097
METHODS AND APPARATUS FOR MAKING
ANIMATED CARTOONS
Jean de Montremy, 8 Ave. des Tilleuls, and Jean Véran
Dejoux, 15 Rue de Castellane, both of Paris, France
Filed Apr. 24, 1964, Ser. No. 362,415
Claims priority, application France, Nov. 16, 1960,
844,085, Patent 1,280,047; Feb. 19, 1964, 964,418,
Patent 85,956, 964,419, Patent 1,411,004
25 Claims. (Cl. 352—133)

This application is a continuation-in-part of copending application Serial No. 152,214, filed November 14, 1961, now abandoned.

The present invention relates to methods and apparatus for making animated cartoons, i.e., for drawing or otherwise recording series of pictures to be projected in succession to give the illusion of movement. The invention also relates to methods and apparatus for projecting such animated cartoons or other series of pictures or photographs which are recorded on film. Such pictures may be projected for direct viewing, for viewing on a screen, for photographic reproduction or for transmission by television.

It is an object of the invention to provide a method and apparatus to facilitate the drawing of cartoons on film.

It is a further object of the invention to provide a method and apparatus for projecting such cartoons or other series of pictures or photographs recorded on film in such manner as to permit a reduction in the speed of projection to a point far below the speeds of projection commonly used today without degradation of the quality of the projected images or of the illusion of movement of the series of projected stationary images due to flicker or otherwise.

Other objects and advantages of the invention will appear hereinafter.

According to the invention, a series of successive pictures of an action seen at regular time intervals are drawn or otherwise recorded on film, so as to form a series of consecutive pictures, a first, odd numbered one, and a second, even numbered one, and so on.

Preferably these pictures are drawn or recorded on two distinct bands of film, the odd numbered pictures on one band and the even numbered pictures on the other band.

In the projection of such pictures, an odd numbered picture and an even numbered picture are always projected as a pair, with the projected images of each pair in superposed position. During the projection of each pair, the luminous intensity of the image of the first picture thereof is decreased gradually from a maximum to zero and the luminous intensity of the image of the second picture of this pair is increased gradually from zero to the same maximum. When the luminous intensity of the image of the first picture which has been decreasing graually is near zero, the film from which that image is projected is moved out of projection position and the third picture of the series is moved into projection position so that it is paired with the second picture. Thereafter, the luminous intensity of the image of the third picture is increased gradually, while the luminous intensity of the image of the second picture is decreased gradually. The foregoing sequence is then repeated time after time with each new picture which is moved into projection position paired for projection with the preceding picture.

The luminous intensity of the projected images is increased and decreased in such a manner that the variation in luminous intensity takes place uniformly over the entire area of the projected images as hereinafter described. Moreover, the rate of decrease of luminous intensity of one image is substantially equal to the rate of increase of luminous intensity of the other image of the pair being projected so that the total luminous intensity of the two superposed images remains substantially constant throughout the projection.

One of the significant advantages of this method of projection is that it makes possible a great reduction of the speed of projection. The speed of projection most commonly used today is 24 frames (i.e. pictures) per second. At these speeds, due to the phenomenon of persistence of vision, the human eye sees what appears to be a continuous projected image, although there is an interval between the projection of successive images during which the film is advanced. During this interval no image is projected. At lower projection speeds, the eye begins to observe the interruptions between successive projected images and projection becomes unsatisfactory.

In the practice of the method of projection of the present invention, satisfactory projection has been achieved at projection speeds as low as 3 frames per second, and very superior projection has been achieved at projection speeds of six to eight frames per second. While the method of projection of the present invention may be used at higher speeds, it appears that there is no useful advantage in using projection speeds in excess of ten frames per second, except for special purposes such as to obtain acceleration effects.

The apparatus according to the invention, as used for making animated cartoons, comprises a recording unit and a projection unit. The recording unit comprises means supporting two film bands in close proximity on which successive pictures are to be drawn or otherwise recorded so as to permit recording pictures alternately on one band and the other as the bands are advanced step by step. The projection unit is adapted to project pictures in accordance with the method previously described.

According to one feature of the invention the recording unit and the projection units are located in close proximity to each other and driving means are provided for moving the two film bands directly from one unit to the other in either direction. Thus, in making animated cartoons, for example, the pictures made in the recording unit may be fed directly to the projection unit for immediate viewing without any intermediate winding. Then, merely by reversing the direction of feed, the pictures which have been projected in the projection unit may be returned immediately to the recording unit to permit correction thereof if necessary.

Owing to this, it is possible to draw or otherwise record very quickly all of the pictures required for a movement of relatively long duration. For instance 20 pictures are sufficient for a movement of five seconds, if the projection speed that is chosen is 4 pictures per second.

It is then possible for the artist, immediately after he has recorded some of the pictures, to project them at various speeds in order to check whether a good illusion of movement has been obtained, and, if not, to return the pictures to the recording unit by moving the films or bands rearwardly to permit making the necessary corrections.

The invention also contemplates means for facilitating the tracing or drawing or otherwise recording of successive pictures as will be hereinafter described.

A preferred embodiment of the invention will be hereafter described with reference to the appended drawings, given merely by way of example, and in which:

FIG. 1 diagrammatically shows two bands or films on which pictures have been drawn to be used according to the invention;

FIG. 2 is a perspective view of the recording unit in which pictures may be recorded on the two bands;

FIG. 3 is a diagrammatic plan view of the projection unit for projecting pictures according to the invention;

FIG. 5 is a plot of the luminous intensities of the projected pairs of pictures as a function of time, and FIG. 6 is a diagrammatic plan view of a modified form of projection unit;

FIG. 7 is a diagrammatic view of a modified form of film advancing means.

Figure 4:
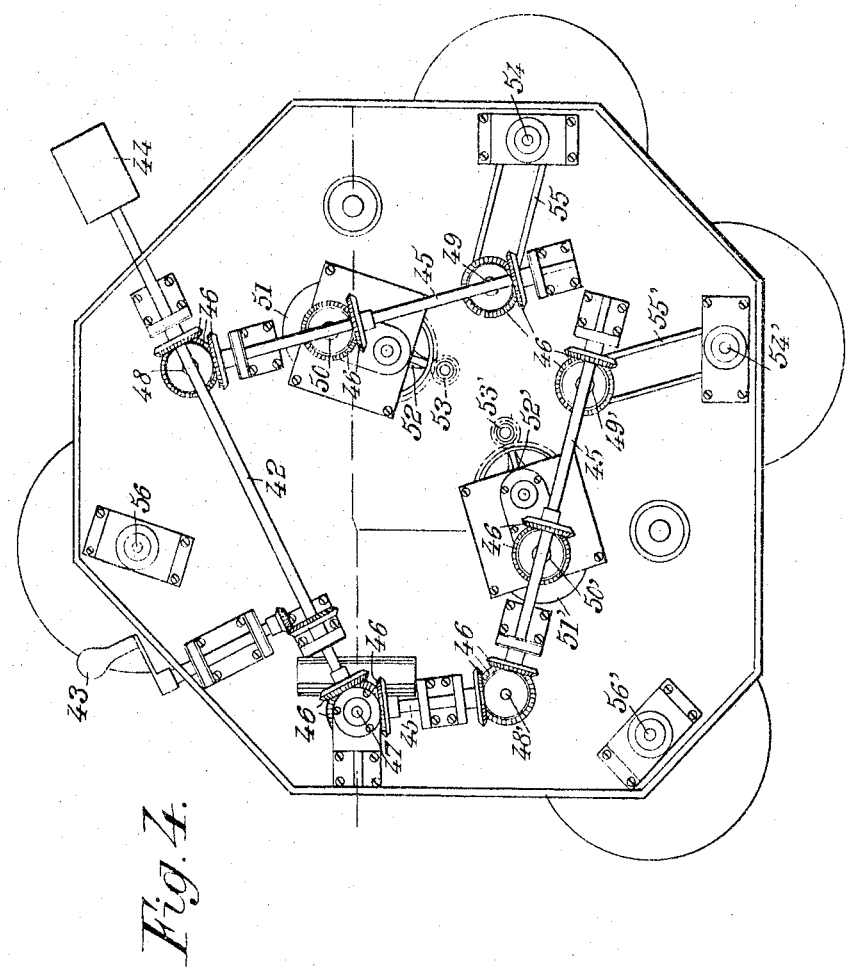
FIG. 4 is a bottom view of the device of FIG. 3.

FIG. 1 shows two bands or films 9, 9' on which pictures have been recorded, the odd numbered pictures 1, 3, 5, 7 being carried by band 9, and the even numbered pictures 2, 4, 6, 8 being carried by band 9'.

As an example, in simple form, the pictures are supposed to show the movement of a needle 10, turning continuously about its axis 11, at the rate of one turn per second. Experience with the present invention teaches that if the needle is shown in positions differing by 90° on successive pictures (1 and 2, 2 and 3 and so on) and if these pictures are projected in the manner herein described at the rate of 4 pictures (1, 2, 3, 4, for instance) per second, the spectator has the illusion of seeing this needle turn in a continuous manner.

FIG. 2 shows the recording unit where the pictures are drawn.

This unit comprises a recording plate or table 13, in which are provided two frosted glass windows 12 and 12' located side by side. The two film bands 9 and 9' are made to pass step by step over the surfaces of these windows, respectively.

Bands 9 and 9', provided with the usual perforations or sprocket holes, are fed from reels 22, 22' and driven by sprockets 14, 14' so as to form loops giving little resistance to the drive of the bands and disposed upstream of table 13. The bands are further driven by other sprockets 15, 15' disposed downstream of table 13. The sprockets are driven step by step by two driving mechanisms, for instance of the Maltese cross or Geneva movement type, these two mechanisms being set in such manner that one of them causes its band to move forward when the other band is stationary.

After passing over sprockets 15, 15', bands 9 and 9' form loops (so as to permit rearward movement) and then pass over other sprockets 16, 16' which feed them to the projection unit illustrated by FIGS. 3 and 4.

All the sprockets 14, 14', 15, 15', 16, 16' are driven from the same shaft (not shown) which is driven in one direction or the other, either by means of a crank-handle or by means of a motor. In order to facilitate rearward displacement of the bands, reels 22 and 22' are provided with resilient drive means urging them constantly in rearward direction so that the bands may be rewound on these reels.

A housing 17 containing a lamp, sliding on rods 18, for example, is moved back and forth, by hand or by suitable mechanism in accordance with the step by step movement of the bands to direct light alternately on window 12 or on window 12', and an optical system is provided for projecting the image of the picture covering the window that is illuminated onto the glass surface of the other window.

In the embodiment shown the optical system comprises objective lenses 19, 19', the focal planes of which coincide with the top surface of windows 12, 12', respectively, and a reflecting prism 21 and an inverting prism 20. This system permits the image of a picture illuminated at one window (e.g. at window 12) to be focused on the other window (e.g. window 12') with the projected image corrected to appear erect and unreversed as a duplicate of the picture at the other window.

Owing to this arrangement, each successive picture may be derived from the projected image of the preceding one by duplicating most of the elements thereof and merely modifying the elements that have moved.

The projector unit shown by FIGS. 3 and 4 permits immediate examination of the animated cartoons obtained from the succession of still pictures drawn on bands 9 and 9'. It also permits projection, not only of animated cartoons, but also of other pictures or photographs recorded on film, for direct viewing or for viewing on a screen, for photographic reproduction, or for transmission by television.

The bands 9, 9', shown in dot and dash lines on FIG. 3, are driven by sprockets 23, 23' so as to form loops between said sprockets 23 and 23' and other sprockets 24 and 24' actuated by step by step driving mechanisms. Then the loops formed after passage over the sprockets 24, 24' which permit reverse movement of the bands, are fed by sprockets 25, 25' to receiving reels 26, 26'.

Just before passing over sprockets 24, 24' the bands pass through gates 27, 27' respectively. Means are provided for passing a beam of light continuously through each of said gates, comprising, respectively, lamps 31, 31', mirrors 29, 29' and condenser lenses 30, 30', mounted in suitable housing 28, 28'. In the embodiment illustrated, the two gates are disposed at an angle of 90°, and the optical axes of the light beams passing through the respective gates are arranged to intersect each other as shown in FIG. 3.

Two polarizing filters 32 and 32', the respective polarization planes of which are arranged at 90° to each other, are disposed respectively at gates 27 and 27'. For example, the polarization planes of filter 32 may be vertical, while the polarization planes of filter 32' may be horizontal.

A glass plate 33 having parallel surfaces, one of which is a semi-transparent and semi-reflecting mirror, is disposed substantially in a plane lying along the angle bisector of the angle formed by the intersecting optical axes of the two lenses. Such mirror surfaces are well known in the art, and for purposes of this invention the mirror surface should be such that the intensity of the transmitted light is substantially equal to the intensity of the reflected light.

The beam from lens 30 is transmitted through said plate 33 whereas the beam from lens 30' is reflected from said plate, these two beam being merged together along a common axis. In order to obtain a perfect coincidence of the projected images, the plate 33 is pivotable about an axis 34 and the angular position about this axis is adjustable by means of a screw 35 against which said plate is urged by a spring 36.

The beams coming from gates 27 and 27' both pass, after transmission through plate 33 for the first one and reflection from this plate for the other, through a third polarizing filter 37 mounted in a ring 38 rotatable continuously with a uniform movement about its axis, under the action of bevel gears 39 and 40.

During the rotation of the polarizing filter 37, whenever its polarization planes are parallel to those of polarizing filter 32, for example, the intensity of the image projected from gate 27 is at a maximum. Thereafter, as the polarizing filter 37 rotates through 90°, the intensity of the image projected from gate 27 decreases gradually from maximum to substantially zero. At the time when the polarization planes of polarizing filter 37 are parallel to those of polarizing filter 32, they are disposed at 90° to those of polarizing filter 32', and the intensity of the image projected from gate 27' is substantially zero. Therefore, during the same rotation of polarizing filter 37 through 90°, and while the intensity of the image projected from gate 27 is decreasing, the intensity of the image projected from gate 27' is increasing gradually from zero to maximum.

It is a characteristic of polarizing filters that as the angle between the polarization planes of the filter 37 and the polarization planes of filters 32, 32' changes, the luminous intensity of each of the projected images changes uniformly over the entire area of the projected images. Moreover, the rate of decrease of intensity of the one image is substantially equal to the rate of increase of intensity of the other image, so that the total luminous intensity of the two superposed images remains substantially constant throughout the projection.

The foregoing is illustrated diagrammatically in FIG. 5, in which a projection rate of four frames per second is assumed. That is, during one second each film band is advanced twice to bring a new picture to projection position. In FIG. 5, time is represented by the horizontal coordinates, and the luminous intensities of the projected images are represented by the vertical coordinates.

Thus, at the beginning of the cycle of operation shown in the diagram, the luminous intensity of the first image projected from "Band 1" is decreasing while the luminous intensity of the image projected from "Band 2" is increasing. When the luminous intensity of the first image projected from "Band 1" is near zero, the band is advanced, as indicated by the arrow, to move the next picture to projection position. It is then paired with the picture of "Band 2," the projected image of which is then at maximum intensity. Then while the luminous intensity of the second image projected from "Band 1" is increasing, the luminous intensity of the image projected from "Band 2" is decreasing, and so on. At each instant of time, the total of the luminous intensities of the two projected images is constant.

As hereinafter explained, each of the film bands 9, 9' is advanced through its respective gate 27 or 27' for projection of the next successive picture at a time when the polarization planes of its respective polarizing filter 32, 32' are disposed near to 90° to the polarization planes of polarizing filter 37 and the intensity of the projected image is near zero. At this time the movement of the band through the gate is not perceptible to the eye.

Ring 38 carries a projector lens or objective 41 mounted therein, the object focal plane of which coincides with the film at each of the gates 27', the image focal plane of which lens 41 coincides with the projection surface, for example, a viewer screen or the objective lens of a television camera.

The animated scenes that are projected may also be observed directly through said lens 41.

It should be noted that while each of the two bands is provided with its own illumination means, the optical system is such that projection lens 41 is common to both of the bands so that projection of the successive pictures from the two bands takes place along a common axis, i.e. the optical axis of this lens. This characteristic is particularly advantageous because it avoids difficulties inherent in the projection of convergent beams. For example, it avoids distortion of the successive images. It also avoids the difficulty of accurate registration of successive images. When the pictures are to be transmitted by television they may be directly projected on the television camera without it being necessary to superpose successive images on an intermediate screen as is the case when the axes of the two beams to be superposed are convergent.

The mechanisms for controlling the advancing of the film bands and the rotation of filter 37 are illustrated in FIG. 4.

These mechanisms comprise a main driving shaft 42, driven at a uniform speed of rotation either manually, by means of a crank handle 43, or by a motor 44. Preferably the motor is reversible and is provided with suitable controls to permit it to operate at the desired speed of rotation. When the recording unit and the projection unit are used together for the recording and immediate projection of animated cartoons, the shaft 42 may be coupled with a shaft for driving sprockets 14, 14', 15, 15' and 16, 16'.

The rotation of the shaft 42 is transmitted to auxiliary shafts 45 by identical mating bevel gears 46. Since the bevel gears are identical, the rotation of shafts 42 and 45 are similarly identical. The rotation of the shafts 42 and 45 is transmitted through bevel pinions 46 to the shaft 47 on which is mounted bevel gear 40 which drives gear 39 (FIG. 3) to the shafts 48 and 48' on which are mounted sprockets 23 and 23', respectively, and to the shafts 50 and 50' on which are mounted, respectively, the control cams 51 and 51' of Maltese crosses 52 and 52' serving to drive in an intermittent manner the shafts 53 and 53' on which are mounted sprockets 24 and 24', respectively. The movement of shafts 49 and 49' is further transmitted to the shafts 54 and 54' of the receiving reels 26 and 26' through sliding belts 55 and 55'.

The gear ratios are chosen in such manner that, for each complete revolution of main driving shaft 42, each of the control cams 51 and 51' makes a complete revolution which produces a rotation of 90° of each of the Maltese crosses 52 and 52', and therefore, produces a complete revolution of shafts 53 and 53' which are driven by said Maltese crosses through gear transmission means having a gear ratio equal to ¼, the control cams 51, 51' being fixed on shafts 50, 50' in such manner that their rotations are offset by one-half revolution of shaft 42 so that the bands 9, 9' are advanced alternately.

As a result, each of the sprockets 23 and 23', 25 and 25' and 25' makes a complete revolution, which advances each of the bands 9 and 9' through its respective gate a length corresponding to one picture frame length, the advancing movements of the bands being in alternation. As is well known the operation of the Maltese crosses 52, 52' will produce very rapid advancing movements of the bands, with each movement followed by a period when the band remains stationary in its gate.

Also, during each complete revolution of the driving shaft 42, polarizing filter 37 rotates through 180°. For this purpose, all the conical pinions 46 have the same number of teeth, and the number of teeth of ring gear 39 is two times that of pinion 40.

When using the apparatus described with reference to FIGS. 2 to 4 for making animated cartoons, the successive pictures may be recorded on bands 9 and 9' alternatively shifting from one picture to the next one by rotating crank-handle 43 through one-half revolution. Then, by turning this crank-handle in a continuous fashion (at the rate of two revolutions per second if 4 pictures are to be projected per second), the artist can see through lens 41 the effect obtained by the projection of the pictures. If the result is not satisfactory, it is only necessary to turn the crank-handle in the reverse direction to return the imperfect pictures to the receiving table 13, where they can be corrected.

As the film strips are printed and checked, the bands carrying the completed pictures may be wound on receiving reels 26 and 26'. For projection of completed reels, the reels may be mounted on hubs 56, 56' and the film bands passed through the gates and sprocket drives for projection as above explained.

It will be understood that the projector unit may be used, not only for the projection of animated cartoons as drawn in the recording unit, but also for the projection of other pictures or photographs recorded on film in any suitable manner.

For some uses of the projector in which high intensity illumination is required, it may be difficult to ensure that the light intensity from the two light sources 31 and 31' of the embodiment shown in FIGS. 3 and 4 will be equal at all times during the projection. For example, for projection onto a large screen, high intensity light sources such as electric arcs may be required. It is known that the light output from such sources is variable and this may result in variation in the luminous intensity of the images projected from the respective gates. In such applications, the embodiment shown in FIG. 6 may advantageously be employed.

In FIG. 6, there is shown a projector similar to the projector shown in FIGS. 3 and 4 and like parts have been identified by the same numerals. Thus, in FIG. 6, the two film bands 9 and 9', respectively, are positioned at projector gates 27 and 27'. Fixed polarizing filters 32 and 32' are positioned in front of gates 27 and 27' respectively with the polarization planes of filters 32 and 32' positioned at right angles as previously described. A rotatably mounted polarizing filter 37 is positioned to intercept the projected images passing through the projector lens 41, the image focal plane of which lens is coincident with the projection surface 58 on which the pictures are to be projected. As thus far recited, the projector is the same as that shown in FIGS. 3 and 4 and operates in the same manner.

However, instead of illuminating the pictures at gates 27 and 27' from independent light sources, a single light source 61 is used, mounted in a suitable housing with a reflector 59 and a condenser lens 60. By arranging the light source 61 at the focal point of the condenser lens, a substantially parallel beam of light 62 will be projected outwardly therefrom. The light beam 62 is then split by semi-reflective, semi-transparent mirror surface 63 of glass plate 33 to divide the beam 62 into two separate beams 64 and 65 of substantially equal intensity. The beams 64 and 65 are reflected, respectively, by prisms 66 and 67 to pass through gates 28 and 27', respectively. The beams, after passage through the gates and the pictures therein, are directed toward the other semi-reflective, semi-transparent mirror surface 57 of glass plate 33 which reflects beam 64 and transmits beam 65 along a common optical path as explained in connection with the embodiment of FIGS. 3 and 4. In the preferred embodiment illustrated, the surface 63 and the surface 57 are formed on opposite surfaces of the glass plate 33 which are flat and parallel. This ensures that the thickness of the plate 33 traversed by each beam 64 and 65 is equal. Therefore, the light intensities transmitted from the source to the output is equal along both paths and there is no image-to-image change of luminous intensity.

The quality of the projected images may be further improved by the use of compensator plates 68 and 69 which may be interposed in the paths of beams 64, 65, as shown. The plates 68 and 69 are of the same thickness and of the same material as plate 33. Compensator plate 69 is interposed in the path of beam 65 between the surface 63 and gate 27' to compensate for the passage of beam 64 through plate 33. Thus, beam 65 passes through the same plate thickness before reaching gate 27' as does beam 64 before reaching gate 27. The compensator plate 69 is parallel to plate 33 so that the thickness of the plate 69 traversed by beam 65 passing therethrough will be equal to the thickness of the plate 33 traversed by the beam 64 passing therethrough. Thus, the illumination passing through the picture in each gate will be identical. Similarly, compensator plate 68 must be interposed in the path of beam 64 between the gate 27 and surface 57 to compensate for the passage of beam 65 through plate 33. The compensator plate 68 is preferably arranged, as shown, at right angles to the plate 33 to eliminate disturbing reflections between the elements.

The compensator plates 68 to 69 may also serve the function of compensating for slight misalignments of the light beams 64 and 65, although such misalignments are usually compensated by slight adjustment of the prisms 66 and 67.

Thus, even if the illumination from source 61 is variable as in the use of an arc lamp, the image to image variation in intensity will be minimized, being derived from the same source.

In the embodiment shown in FIG. 6, it is also possible to utilize the single source for projection of additional images. For example, in the projection of animated cartoons, it may be desirable to project the cartoons against a background image, either satisfactory or moving. In such cases the background picture may be carried by film band 70 which extends across the beam 62 before splitting thereof. To enable focussing of the background image, a suitable lens 71 is provided which may be adjusted to focus the image of the picture carried on the band 70 on the projection surface 58.

Thus, in this manner, the background may be projected from the pictures on the film band 70 to be combined at the projection surface 58 with the images projected from the pictures on bands 9 and 9' and superimposed thereon. The film band 70 may be moved across the beam 62 if the background is to be changed or moved with respect to the foreground subject material projected from bands 9, 9'.

In some cases in which a background image is used, it may be advisable to record parts of the pictures on the film bands over an opaque coating on the film in order to avoid superposing of images projected from the bands 9, 9' on images projected from band 70. For example, if images of an animal are projected from the bands 9, 9', while an image of a tree is projected from band 70, and if the images are superposed, the result is unrealistic. However, if the pictures from which the images of the animal are projected are recorded over an opaque coating, the portion of the background tree image on which the animal images are superposed is obliterated, and the animal images appear as black silhouettes. However, if it is desired to restore the detail of the animal images, the films in the gates 27, 27' may be illuminated by lamps 72, 72' which direct light toward the film in each of said gates to reflect images from the opaque portions of the pictures in the gates. The lamps 72, 72' are arranged, as shown, so that the light therefrom passes through the polarizing filters 32, 32', respectively, so that the reflected light is polarized in the same manner as the transmitted light.

In some cases, it may be desirable to advance the film bands 9, 9' through the gates 27, 27' more rapidly than is possible by the use of Maltese crosses 52, 52' as previously described. The modification illustrated in FIG. 7 makes possible very rapid advance of the film bands at a speed which is independent of the speed of projection.

Thus, as shown in FIG. 7, the rim of the ring 38 may be provided with cams 73, 73' adapted to engage and operate switches 74, 74' to control electrical circuits which include electro-magnets 75, 75' which replace the Maltese crosses to actuate the sprockets 24, $24_2$ through any suitable mechanical devices such, for example, as a rack and pinion (not shown). As shown, the cams 73, 73' are arranged at diametrically opposite positions on the rim of ring 38, while the switches are disposed at 90° to each other. In the position shown in FIG. 7, the switch 74 is about to be closed by cam 73 to energize the magnet 75 to advance one of the film bands, for example, the band 9. Then upon rotation of the ring 38 through 90°, the switch 74' will be closed by cam 73 to energize the magnet 75' to advance the film band 9. Upon further rotation of the ring 38 through 90° the switch 74 will be closed by cam 73' to again energize the magnet 75 to again advance the film band 9', and so on.

It will be understood that as soon as the switches 74, 74' are closed, the electromagnets are energized to advance the respective film bands, and that the speed of advance of the film bands is determined by the characteristics of the electromagnets, and is independent of the speed of projection. That is, if the magnets are of such character as to advance the film bands one frame length in 1/100 of a second, for example, they will always be advanced at this speed when the switches 74, 74' are closed, regardless of whether the speed of projection is 3 frames per second or 8 frames per second.

This invention may be variously modified and embodied within the scope of the subjoined claims.

We claim as our invention:

1. The method of making animated cartoons which comprises recording a first picture on a first band of film, projecting an image of said picture onto a second band of film, recording a second picture on said second band in superposed relation to the projected image of said first picture, projecting an image of said second picture onto said first band in spaced relation to the said first picture, and recording a third picture on said first band in superposed relation to the projected image of said second picture.

2. The method claimed in claim 1 which includes advancing said first band one frame length after said first picture has been recorded thereon, and which includes projecting the image of said second picture on said first band at a position one frame length behind said first picture.

3. The method claimed in claim 1 which includes advancing said bands alternately one frame length at a time.

4. The method claimed in claim 1 which includes advancing said bands alternately one frame length at a time with each band being advanced after the last picture recorded thereon has been projected onto the other band.

5. The method of making animated cartoons which comprises recording a series of individual pictures which constitute an animated sequence directly onto two separate bands of film, successive pictures of the sequence being recorded alternately first on one band and then on the other band, and projecting an image of each successive picture recorded on each band onto an area of the other band on which the next picture of the sequence is to be recorded.

6. The method of making animated cartoons which comprises recording a series of individual pictures which constitute an animated sequence directly onto two separate bands of film, the first picture of the sequence being drawn on a first band, the second picture of the sequence being drawn on a second band, and so on throughout the sequence, projecting an image of the first picture onto the second band before drawing the second picture of the sequence thereon, projecting an image of the second picture onto the first band before drawing the third picture of the sequence thereon, and so on throughout the sequence.

7. The method claimed in claim 5 which includes advancing said bands alternately one frame length at a time after a picture has been drawn thereon.

8. Apparatus for making animated cartoons comprising, a recording table having two spaced recording areas, means for guiding two bands of film across said recording table with one of said bands extending across one of said recording areas and the other band extending across the other of said recording areas, means for advancing said strips alternately and intermittently, with each strip being advanced one frame length at a time, and means for projecting an image of a picture on the first of said bands onto the second of said bands at the recording area thereof during a period between successive advancing movement thereof, and for projecting an image of a picture on the second of said bands onto the first of said bands at the recording area thereof during a period between successive advancing movement thereof.

9. Apparatus as claimed in claim 8 in which said advancing means advances said bands alternately one frame length at a time.

10. The method of projecting motion pictures in which a series of images are projected from a series of pictures recorded on film which comprises feeding film on which the first and third pictures of the series are recorded into a first film gate in position to expose the first picture through said gate, feeding film on which the second and fourth pictures of the series are recorded into a second film gate in position to expose the second picture through said gate, passing a beam of light continuously through each of said film gates to project the image of the two pictures exposed at said film gates simultaneously in superposed relation, continuously decreasing the luminous intensity of the projected image of the first of said pictures uniformly over the entire area of the projected image from maximum intensity to substantially zero intensity while simultaneously continuously increasing the luminous intensity of the projected image of the second of said pictures uniformly over the entire area of the projected image from substantially zero intensity to maximum intensity, advancing the film on which the first of said pictures is recorded while the luminous intensity of its projected image is near zero into position to expose the third of said pictures through said gate, continuously increasing the luminous intensity of the projected image of the third of said pictures uniformly over the entire area of the projected image from substantially zero intensity to maximum intensity while simultaneously continuously decreasing the luminous intensity of the projected image of the projected image of the second of said pictures uniformly over the entire area of the projected image from maximum intensity to substantially zero intensity, and advancing the film on which the second of said pictures is recorded while the luminous intensity of its projected image is near zero into position to expose the fourth of said pictures, the total luminous intensity of the superposed projected images remaining substantially constant over the entire area thereof throughout the projection.

11. The method of projecting motion pictures in which a series of images are projected from a series of pictures recorded on film which comprises feeding film on which the odd numbered pictures of the series are recorded into a first film gate, feeding film on which the even numbered pictures of the series are recorded into a second film gate, passing a beam of light continuously through each of said film gates to project the images of the two pictures exposed at said film gates simultaneously in superposed relation, continuously changing the luminous intensity of the projected images of each of said pictures uniformly over the entire area thereof while exposed in its respective film gate from substantially zero intensity to maximum intensity and then from maximum intensity to substantially zero intensity, the luminous intensity of the projected images of each of said odd numbered pictures being at a maximum when the luminous intensity of the projected images of each of said even numbered pictures is substantially zero and vice versa, the total luminous intensity of the superposed projected images remaining substantially constant over the entire area thereof throughout the projection, advancing film on which said odd numbered pictures are recorded through said first film gate while the luminous intensity of each image projection therefrom is near zero into position to expose the next odd numbered picture of the series through said first gate, and alternately advancing film on which said even numbered pictures are recorded through said second film gate while the luminous intensity of each image projected therefrom is near zero into position to expose the next even numbered picture of the series through said second gate.

12. Apparatus for projecting motion pictures in which a series of images are projected from a series of pictures recorded on film, comprising, two separate film gates, separate means for advancing a film band intermittently through each of said gates, means for passing a beam of light continuously through the film band at each of said gates, an optical system for transmitting said beams to project the images of the recorded pictures exposed at said gates simultaneously and continuously in superposed relation, means interposed in said optical system for continuously changing the luminous intensity of the projected images of each of said pictures uniformly over the entire area thereof while exposed in its respective gate from substantially zero intensity to maximum intensity and then from maximum intensity to substantially zero intensity, the luminous intensity of the images projected from the pictures at the first gate being at a maximum when the luminous intensity of the images projected from the pictures at the second gate are substantially zero and vice versa, said film advancing means advancing the film band at each gate at a time when the luminous intensity of the image projected from that gate is near zero.

13. Apparatus as claimed in claim 12 in which said optical system includes a common projector lens, and in which said means for changing the luminous intensity of the projected images includes a polarizing filter at each of said gates, the polarization planes of said filters being arrange at 90° to each other, a third polarizing filter at said projector lens, and means for rotating said third polarizing filter in timed relation to said film advancing means to cause said filter to rotate through 180° between successive advancing movements of each of said advancing means.

14. Apparatus as claimed in claim 12 in which said optical system includes a common projector lens, and in which said means for changing the luminous intensity of the projected images includes a polarizing filter at each of said gates, the polarization planes of said filters being arranged at 90° to each other, a third polarizing filter at said projector lens, and means for rotating said third polarizing filter in timed relation to said film advancing means to cause said filter to rotate through 180° between successive advancing movements of each of said advancing means, and means for directing light toward the film in each of said gates through the polarizing filters at said gates to reflect images from the films in said gates.

15. Apparatus as claimed in claim 12 in which said means interposed in said optical system for changing the luminous intensity of the projected images includes a continuously rotating member, and in which each of said separate means for advancing a film band intermittently through a gate included an electro-magnet, and means controlled by said continuously rotating member for alternately energizing said electro-magnets to advance the respective film bands alternately at a speed which is independent of the speed of rotation of said rotating member.

16. Apparatus for projecting motion pictures in which a series of pictures are recorded on film, comprising, two separate film gates, a single projector lens, an optical system for transmitting a beam of light through each of said gates to said projector lens, a polarizing filter at each of said gates disposed in the path of the light transmitted through the gate, the polarization planes of said filters being disposed at 90° to each other, a third polarizing filter at said projection lens disposed in the path of the light transmitted through said lens, and means for rotating said third polarizing filter to vary the intensity of the light transmitted through said projector lens from each of said gates.

17. Apparatus as claimed in claim 16 in which the axes of the light beams passing through said gates intersect each other, a mirror having semi-transparent, semi-reflecting surface interposed in the path of said beams and bisecting the angle therebetween and adapted to transmit one beam and reflect the other beam along a common axis to said projector lens.

18. Apparatus as claimed in claim 16, including means for directing light toward the film in each of said gates through the polarizing filters at said gates to reflect images from the films in said gates.

19. Apparatus for projecting motion pictures in which a series of images are projected from a series of pictures recorded on film, comprising, a single light source, two separate film gates, a single projector lens, an optical system for transmitting a beam of light from said light source through each of said gates to said projector lens, said optical system including a mirror having a semi-transparent, semi-reflecting surface interposed in the light beam emanating from said light source and adapted to split said beam into two separate angularly disposed beams, one transmitted through said surface and one reflected therefrom, means for directing said angularly disposed beams to pass through said gates, with said transmitted beam passing through one gate and said reflected beam passing through the other gate in directions to intersect each other after passing through said gates, a second mirror having a semi-transparent, semi-reflecting surface interposed in the path of said beams and bisecting the angle therebetween and adapted to transmit one beam and reflect the other along a common axis to said projector lens.

20. Apparatus as claimed in claim 19 including means for mounting a film band in the path of said beam of light between said single source and said first named mirror.

21. Apparatus as claimed in claim 19 in which each of said mirrors comprises a transparent plate of uniform thickness having parallel surfaces, a pair of transparent compensator plates of uniform thickness equal to the thickness of said first named plate, one of said compensator plates being interposed in the path of said reflected beam before it passes through its gate, and the other of said compensator plates being interposed in the path of said transmitted beam after it passes through its gate, each of said compensator plates being disposed at an angle to its respective beam which is equal to the angle at which said beam is reflected from its respective semi-reflective mirror.

22. Apparatus as claimed in claim 21 in which one of said compensator plates is disposed in parallel relation to one of said mirrors, and the other of said compensator plates is disposed at 90° to the other of said mirrors.

23. A method of making and projecting animated cartoons comprising drawing on two distinct strips of film individual illustrations of an animated sequence in which the illustrations represent a time interval of between ⅓ and ⅛ of a second in said sequence, said illustrations being drawn on said strips of film with successive illustrations sequentially arranged in alternating fashion on said strips, projecting the individual illustrations in superimposed pairs such that each illustration is first superimposed with the preceding illustration on the other of the strips and then with the subsequent illustration on the other of the strips, gradually varying the light intensity during projection for each of said illustrations to furnish an illusion of continuous movement by gradually increasing the luminous intensity from zero to a maximum of the first mentioned illustration while the superimposed preceding illustration on the other strip is being gradually reduced in luminous intensity from a maximum to zero with the total light intensity during superimposure remaining substantially constant, and superimposing the subsequent illustration of said other strip on the first said illustration when the light intensity of said preceding illustration is zero.

24. A method of making and projecting animated cartoons comprising drawing on two distinct strips of film individual illustrations of an animated sequence in which the illustrations are at a time interval of between ⅓ and ⅛ of a second in said sequence, said illustrations being drawn on said strips of film with successive illustrations sequentially arranged in alternating fashion on said strips, alternately advancing the strips in stepwise fashion at a speed which may be as low as 3 to 8 illustrations per second while projecting a pair of superimposed images of successive illustrations and gradually varying the light intensity of the superimposed images to furnish an illusion of continuous movement by gradually decreasing the luminous intensity of the illustration of the next strip to be advanced from a maximum to zero while gradually increasing the luminous intensity of the other of the illustrations of the superimposed images from zero to a maximum while the total light intensity during superimposure remains substantially constant, said film strips being respectively advanced when the luminous intensity of the superimposed image thereof has reached zero.

25. A method as claimed in claim 10 comprising directly projecting the superimposed images onto a television camera for distribution over a television circuit.

References Cited by the Examiner

UNITED STATES PATENTS

| | | | |
|---|---|---|---|
| 904,212 | 11/1908 | Moran | 88—28 |
| 1,247,646 | 11/1917 | Craig. | |
| 1,806,452 | 5/1931 | Fulgora | 88—24 |
| 1,929,360 | 10/1933 | Knox | 88—24 |
| 1,929,815 | 10/1933 | Grino et al. | 88—28 X |
| 1,947,668 | 2/1934 | Warmisham | 88—24 |
| 2,099,694 | 11/1937 | Land | 352—60 |
| 2,307,202 | 1/1943 | Eddy | 88—24 |
| 2,351,634 | 6/1944 | Place | 352—51 |
| 2,565,185 | 8/1951 | Pastor | 352—62 |
| 2,851,922 | 9/1958 | Rosin | 88—24 |
| 3,060,795 | 10/1962 | Corrigan et al. | 88—24 |

FOREIGN PATENTS

| | | |
|---|---|---|
| 554,272 | 6/1943 | Great Britain. |

OTHER REFERENCES

Fallberg, Carl: Animated Cartoon Production Today, Part II: Production Preparation; American Cinematographer, pp. 202, 203 and 232–237, May 1942.

NORTON ANSHER, *Primary Examiner*.